US010324646B2

(12) United States Patent
Wang et al.

(10) Patent No.: US 10,324,646 B2
(45) Date of Patent: Jun. 18, 2019

(54) NODE CONTROLLER AND METHOD FOR RESPONDING TO REQUEST BASED ON NODE CONTROLLER

(71) Applicant: Huawei Technologies Co., Ltd., Shenzhen (CN)

(72) Inventors: Gongyi Wang, Hangzhou (CN); Ben Chen, Hangzhou (CN); Yafei Zhao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/066,623

(22) Filed: Mar. 10, 2016

(65) Prior Publication Data

US 2016/0196087 A1 Jul. 7, 2016

Related U.S. Application Data

(63) Continuation of application No. PCT/CN2014/085969, filed on Sep. 5, 2014.

(30) Foreign Application Priority Data

Sep. 10, 2013 (CN) .......................... 2013 1 0410556

(51) Int. Cl.
*G06F 3/06* (2006.01)
*G06F 9/54* (2006.01)
(Continued)

(52) U.S. Cl.
CPC .......... *G06F 3/0638* (2013.01); *G06F 3/0604* (2013.01); *G06F 3/0673* (2013.01);
(Continued)

(58) Field of Classification Search
CPC ........ G06F 3/0638; G06F 3/0604; G06F 9/54; G06F 12/0813; G06F 12/0817; G06F 12/0831; G06F 2212/1048
See application file for complete search history.

(56) References Cited

U.S. PATENT DOCUMENTS 6,266,743 B1 7/2001 Carpenter et al.
6,754,782 B2 * 6/2004 Arimilli .............. G06F 12/0817
711/119
(Continued)

FOREIGN PATENT DOCUMENTS

CN 101414268 A 4/2009
CN 102023898 A 4/2011
(Continued)

OTHER PUBLICATIONS

Foreign Communication From a Counterpart Application, European Application No. 14843838.5, Extended European Search Report dated Sep. 5, 2016, 7 pages.
(Continued)

*Primary Examiner* — Michael Krofcheck
(74) *Attorney, Agent, or Firm* — Conley Rose, P.C.

(57) ABSTRACT

A node controller-based request responding method and node controller, where the method includes receiving, by a first node controller, a first packet, acquiring an information directory, and querying, in the information directory, whether a memory address requested by the first packet is occupied by a second node controller, and when the memory address requested by the first packet is occupied by the second node controller, querying node presence information to determine whether the second node controller exists, and when it is determined that the second node controller does not exist, generating and sending an invalid response packet.

7 Claims, 5 Drawing Sheets

(51) Int. Cl.
*G06F 12/0813* (2016.01)
*G06F 12/0817* (2016.01)
*G06F 12/0831* (2016.01)

(52) U.S. Cl.
CPC ............ *G06F 9/54* (2013.01); *G06F 12/0813* (2013.01); *G06F 12/0817* (2013.01); *G06F 12/0831* (2013.01); *G06F 2212/1048* (2013.01)

(56) References Cited

U.S. PATENT DOCUMENTS

| | | | | |
|---|---|---|---|---|
| 2006/0045006 | A1* | 3/2006 | Morioka | H04L 12/437 370/221 |
| 2006/0085580 | A1* | 4/2006 | Gupta | G06F 13/24 710/260 |
| 2006/0253662 | A1* | 11/2006 | Bass | G06F 12/0831 711/154 |
| 2007/0156972 | A1* | 7/2007 | Uehara | G06F 12/0822 711/146 |
| 2007/0204111 | A1* | 8/2007 | Khare | G06F 12/0817 711/146 |
| 2008/0005486 | A1* | 1/2008 | Mannava | G06F 12/0831 711/146 |
| 2009/0248989 | A1 | 10/2009 | Chicheportiche et al. | |
| 2010/0180021 | A1 | 7/2010 | Abdul et al. | |
| 2012/0151458 | A1 | 6/2012 | Oehrstrom | |
| 2012/0226817 | A1* | 9/2012 | Woxblom | H04L 12/2809 709/231 |
| 2013/0111150 | A1 | 5/2013 | Zhao et al. | |
| 2013/0132678 | A1* | 5/2013 | Hosokawa | G06F 12/084 711/130 |
| 2013/0262553 | A1* | 10/2013 | Ito | G06F 15/167 709/201 |
| 2013/0262782 | A1* | 10/2013 | Sugizaki | G06F 12/0891 711/144 |
| 2014/0006720 | A1 | 1/2014 | Hosokawa et al. | |
| 2015/0095008 | A1 | 4/2015 | Endong et al. | |

FOREIGN PATENT DOCUMENTS

| | | |
|---|---|---|
| CN | 102439571 A | 5/2012 |
| CN | 102662770 A | 9/2012 |
| CN | 103020004 A | 4/2013 |
| CN | 103150264 A | 6/2013 |
| CN | 103488606 A | 1/2014 |
| WO | 2012077169 A1 | 6/2012 |
| WO | 2012124094 A1 | 9/2012 |

OTHER PUBLICATIONS

Partial English Translation and Abstract of Chinese Patent Application No. CN103488606, Mar. 14, 2016, 4 pages.
Foreign Communication From a Counterpart Application, Chinese Application No. 201310410556.3, Chinese Office Action dated Sep. 18, 2015, 6 pages.
Foreign Communication From a Counterpart Application, PCT Application No. PCT/CN2014/085969, English Translation of International Search Report dated Nov. 25, 2014, 2 pages.
Foreign Communication From a Counterpart Application, PCT Application No. PCT/CN2014/085969, English Translation of Written Opinion dated Nov. 25, 2014, 8 pages.
Machine Translation and Abstract of International Publication No. WO2012077169, Jun. 14, 2012, 17 pages.
Foreign Communication From a Counterpart Application, European Application No. 17200376.6, Extended European Search Report dated Jun. 8, 2018, 8 pages.

* cited by examiner

NODE CONTROLLER AND METHOD FOR RESPONDING TO REQUEST BASED ON NODE CONTROLLER

CROSS-REFERENCE TO RELATED APPLICATIONS

This application is a continuation of International Application No. PCT/CN2014/085969, filed on Sep. 5, 2014, which claims priority to Chinese Patent Application No. 201310410556.3, filed on Sep. 10, 2013, both of which are hereby incorporated by reference in their entireties.

TECHNICAL FIELD

The present disclosure relates to the field of communications technologies, and in particular, to a node controller-based request responding method and apparatus.

BACKGROUND

A modern advanced feature of a system architecture enables a processor (central processing unit (CPU)) to have error report and error correction capabilities, and a CPU hot swap technology is supported. Some original equipment manufacturers have supported hot swap of non-uniform memory access (NUMA) hardware, that is, insertion and removal of a physical node. This advanced feature requires that a kernel can remove, if necessary, a CPU that is being used. For example, to meet a requirement of a remote access service (RAS), a CPU that executes malicious code must be kept out of a system execution path. Therefore, a LINUX kernel needs to support the CPU hot swap technology. An operating system (OS) takes the CPU logically offline, the operating system no longer uses a CPU thread that is taken offline, and a process and an interrupt that are originally bound to the CPU thread are also migrated to another thread.

In a case based on multi-node interconnection, hot removal may be performed on a node controller (NC) on a node or be performed on a CPU. If logical and physical removal needs to be performed on the NC, in addition to the operation of removing a CPU introduced previously, the OS further takes memory of the node offline, where the OS migrates data that is being used in address space of the node to memory of another node, and no longer allocates new memory space to this address segment. Assume that there are an NC0, an NC1, an NC2 and an NC3 in a system and removal is performed on the NC3. After all services in all CPUs on an NC3 node are migrated, nothing runs in the CPUs of the NC3 node, other nodes do not use memory of the NC3 node, and the NC3 node does not access memory of the other nodes. However, because there is directory information on an NC, information about the NC3 previously occupying memory data on the other nodes may be reserved.

Assuming that data at a memory address Addr0 on the NC0 is occupied by the NC3, the following cases exist when logical removal is performed on the NC3:

TABLE 1

| | DIR Status | NC3 | NC2 | NC1 | NC0 |
|---|---|---|---|---|---|
| Addr0 | E | 1 | 0 | 0 | 0 |
| | | ⇩ | | | |
| Addr0 | I | 0 | 0 | 0 | 0 |

Data at an Addr0 on the NC3 is modified to be in an I state

Table 1 indicates that a CPU on the NC3 exclusively occupies the memory address Addr0 on the NC0, and then, an E state and exclusive occupation by the NC3 are recorded as directory information of the NC0. If the CPU on the NC3 modifies the data at the address, when the logical removal is performed on the NC3, the data is written back to memory of a CPU on the NC0, and the directory information is updated to be in an I state.

TABLE 2

| | DIR Status | NC3 | NC2 | NC1 | NC0 |
|---|---|---|---|---|---|
| Addr0 | E | 1 | 0 | 0 | 0 |
| | | ⇩ | | | |
| Addr0 | E | 1 | 0 | 0 | 0 |

Data at the Addr0 on the NC3 is not modified

Table 2 indicates that a CPU on the NC3 exclusively occupies the memory address Addr0 on the NC0, and then, an E state and exclusive occupation by the NC3 are recorded as directory information of the NC0. However, because the CPU on the NC3 does not modify the data at the address, when the logical removal is performed on the NC3, the data is not written back to memory of a CPU on the NC0, and the directory information still indicates that the NC3 exclusively occupies the data at the Addr0.

TABLE 3

| | DIR Status | NC3 | NC2 | NC1 | NC0 |
|---|---|---|---|---|---|
| Addr0 | S | 1 | 0 | 1 | 0 |
| | | ⇩ | | | |
| Addr0 | S | 1 | 0 | 1 | 0 |

Table 3 indicates that a CPU on the NC3 shares the memory address Addr0 on the NC0, and then, an S state and sharing by the NC3 and the NC1 are recorded as directory information of the NC0. If the data is not written back to memory of a CPU on the NC0 when logical removal is performed on an NC node, the directory information still indicates that the NC3 and the NC1 share the data at the Addr0.

In the last two cases, if the directory information on the NC0 is not updated, and if a CPU0 on the NC0 needs to exclusively occupy the data at the Addr0, a snoop message is sent to the NC3 according to a CC protocol. In this case, if the NC3 has been physically removed, the snoop message cannot be responded, a system is suspended consequently.

An existing solution is, before the physical removal is performed on the NC3, CPUs on other NC nodes all send, to a remote node, an exclusive-occupation request regarding space of all memory addresses of the nodes. After all the memory addresses are updated in this manner, directory statuses in Table 2 and Table 3 are respectively changed to those shown in the following Table 4 and Table 5.

TABLE 4

| | DIR Status | NC3 | NC2 | NC1 | NC0 |
|---|---|---|---|---|---|
| Addr0 | E | 1 | 0 | 0 | 0 |
| | | ⇩ | | | |
| Addr0 | I | 0 | 0 | 0 | 0 |

TABLE 5

| | DIR Status | NC3 | NC2 | NC1 | NC0 |
|---|---|---|---|---|---|
| Addr0 | S | 1 | 0 | 1 | 0 |
| | ⇩ | | | | |
| Addr0 | I | 0 | 0 | 0 | 0 |

The other nodes no longer have directory status information about occupation by the NC3, and all directory statuses change to invalid statuses. Performing the physical removal on the NC3 in this case may ensure that the system is not suspended not crash.

However, because other nodes need to update local memories one time when this method is applied to removal of a node, it takes excessive usage time of an OS, causing extremely slow response of the system and greatly degrading system performance. In actual tests, if 256 gigabyte (GB) of memory on a single node is updated, and a basic input/output system (BIOS) occupies 60% to 70% of CPU time slices, it requires about 20 minutes to complete the updating, and during this period, OS response becomes extremely slow, which is basically unacceptable to a user. In addition, a greater memory size of a single node and a larger system scale lead to longer time required for updating the memory.

SUMMARY

Embodiments of the present disclosure provide a snoop-related method and apparatus, where an information directory of another NC can be configured when an NC is removed in order to update recorded information about a memory address of each NC being occupied by a removed NC node, without a need to perform memory updating update on a CPU of each node. In this way, it is implemented that a current NC processes a snoop or request packet destined for the removed node and directly converts a snoop request to an invalid response, thereby greatly improving performance and reliability of a system.

According to a first aspect, an embodiment of the present disclosure provides a NC-based request responding method, where the method includes receiving, by a first NC, a first packet, where the first packet is a snoop packet from an interface of a CPU or a request packet from an interface of another NC, acquiring an information directory, and querying, in the information directory, whether a memory address requested by the first packet is occupied by a second NC, where the information directory includes information about a memory address of a current NC being occupied by another NC, when the memory address requested by the first packet is occupied by the second NC, querying node presence information to determine whether the second NC exists, and generating and sending an invalid response packet when it is determined that the second NC does not exist, where a destination node identifier (DNID) of the invalid response packet is a source node identifier (SNID) of the first packet, and an SNID of the invalid response packet is a DNID of the first packet.

In a first possible implementation manner, after the generating and sending an invalid response packet when it is determined that the second NC does not exist, the method further includes modifying, in the information directory, information about a memory address of the first NC being occupied by the second NC, releasing the memory address occupied by the second NC, and updating the node presence information to update information about the second NC to that the second NC does not exist.

In a second possible implementation manner, the method further includes, if the second NC exists, processing the first packet to generate a second packet, and sending the second packet to an interface of the second NC.

In a third possible implementation manner, when the memory address requested by the first packet is not occupied by the second NC, the method further includes, when the first packet is a snoop packet sent by an interface of a first processor on the first NC, generating an invalid response packet and sending the invalid response packet to the interface of the first processor.

In a fourth possible implementation manner, when the memory address requested by the first packet is not occupied by the second NC, the method further includes, when the first packet is a data or status request packet from an interface of a third NC, sending the request packet to an interface of a first processor such that the first processor records information about the request packet.

According to a second aspect, an embodiment of the present disclosure provides a NC-based request responding method, where the method includes receiving, by a first NC, a snoop packet sent by an interface of a second NC, where a DNID of the snoop packet indicates a first processor, acquiring processor presence information, where the processor presence information includes information about whether a processor exists on a current node, and if the first processor does not exist, generating an invalid response packet and sending the invalid response packet to the interface of the second NC, where a DNID of the invalid response packet is an SNID of a first packet, and an SNID of the invalid response packet is a DNID of the first packet.

In a first possible implementation manner, the method further includes, if the first processor exists, sending the snoop packet to an interface of the first processor.

In a second possible implementation manner, the method further includes, when the first processor is removed, updating recorded information of the first processor in the processor presence information to update the recorded information of the first processor to that the first processor does not exist.

According to a third aspect, an embodiment of the present disclosure provides a request responding apparatus, where the apparatus includes a receiving unit configured to receive a first packet, where the first packet is a snoop packet from an interface of a CPU or a data or status request packet from an interface of another NC, an acquiring unit configured to acquire an information directory, where the information directory includes information about a memory address of a current NC being occupied by another NC, a first identification unit configured to query, in the information directory, whether a memory address requested by the first packet is occupied by a second NC, a second identification unit configured to, when the memory address requested by the first packet is occupied by the second NC, query node presence information to determine whether the second NC exists, and a processing unit configured to, when it is determined that the second NC does not exist, generate and send an invalid response packet, where a DNID of the invalid response packet is an SNID of the first packet, and an SNID of the invalid response packet is a DNID of the first packet.

In a first possible implementation manner, the apparatus further includes an information directory management unit configured to modify, in the information directory, information about a memory address of a first NC being occupied by the second NC, release the memory address occupied by the second NC, and update the node presence information to update information about the second NC to that the second NC does not exist.

In a second possible implementation manner, the processing unit is further configured to, if the second NC exists, process the first packet to generate a second packet, and send the second packet to an interface of the second NC.

In a third possible implementation manner, the processing unit is further configured to, when the memory address requested by the first packet is not occupied by the second NC, when the first packet is a snoop packet sent by an interface of a first processor on the first NC, generate an invalid response packet and send the invalid response packet to the interface of the first processor.

In a fourth possible implementation manner, the processing unit is further configured to, when the memory address requested by the first packet is not occupied by the second NC, when the first packet is a data or status request packet from an interface of a third NC, send the request packet to an interface of a first processor such that the first processor records information about the request packet.

According to a fourth aspect, an embodiment of the present disclosure provides a request responding apparatus, where the apparatus includes a receiving unit configured to receive a snoop packet sent by an interface of a second NC, where a DNID of the snoop packet indicates a first processor, an acquiring unit configured to acquire processor presence information, where the processor presence information includes information about whether a processor exists on a current node, an identification unit configured to identify, according to the processor presence information, whether the first processor exists, and a processing unit configured to, if the first processor does not exist, generate an invalid response packet and send the invalid response packet to the interface of the second NC, where a DNID of the invalid response packet is an SNID of the snoop packet, and an SNID of the invalid response packet is the DNID of the snoop packet.

In a first possible implementation manner, the processing unit is further configured to, if the first processor exists, send the snoop packet to an interface of the first processor.

In a second possible implementation manner, the apparatus further includes a processor presence information management unit configured to, when the first processor is removed, update recorded information of the first processor in the processor presence information to update the recorded information of the first processor to that the first processor does not exist.

According to a snoop-related method and apparatus in the embodiments of the present disclosure, it is queried, in an information directory, whether a memory address requested by a snoop packet from an interface of a CPU or by a data or status request packet from an interface of another NC is occupied by another NC in order to determine whether the snoop or request packet is destined for a removed node. In this way, it is implemented that a current NC processes the snoop or request packet destined for the removed node and directly converts the snoop or request packet to an invalid response, thereby greatly improving performance and reliability of a system.

The following further describes the technical solutions of the embodiments of the present disclosure in detail with reference to the accompanying drawings and embodiments.

DESCRIPTION OF EMBODIMENTS

Figure 1:
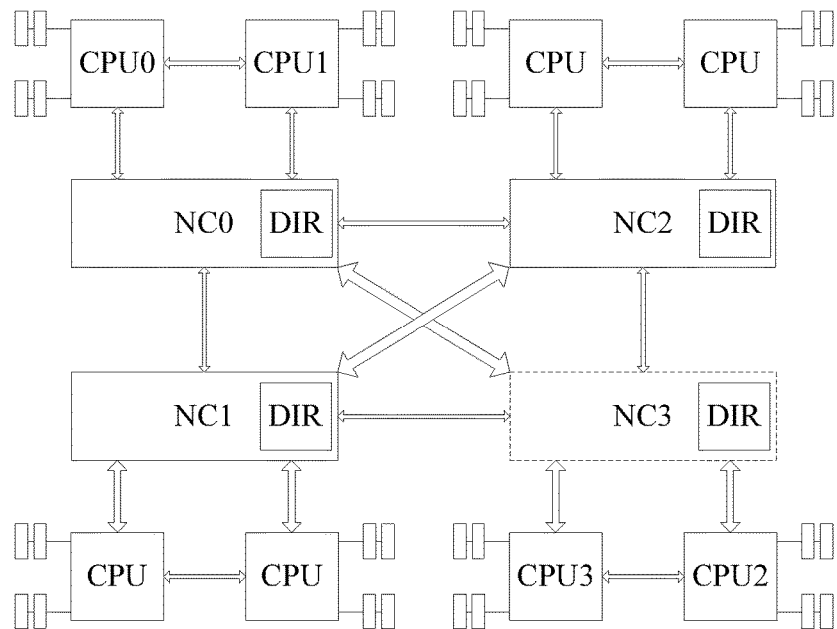
FIG. 1 is a schematic diagram of multi-node interconnection according to Embodiment 1 of the present disclosure.
Figure 2:
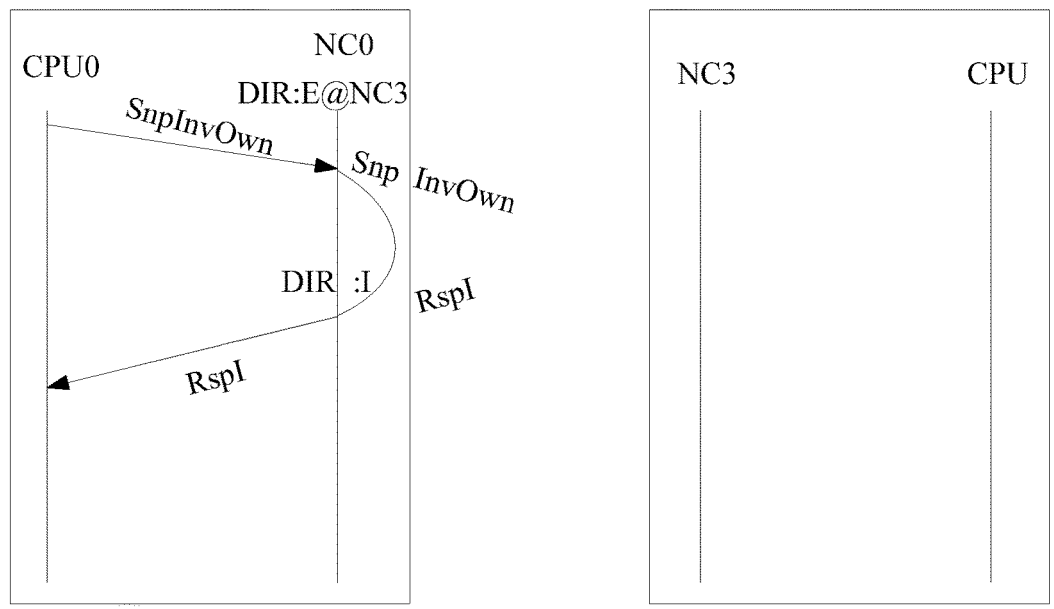
FIG. 2 is a swim lane diagram of packet sending and responding according to Embodiment 1 of the present disclosure.
Figure 3:
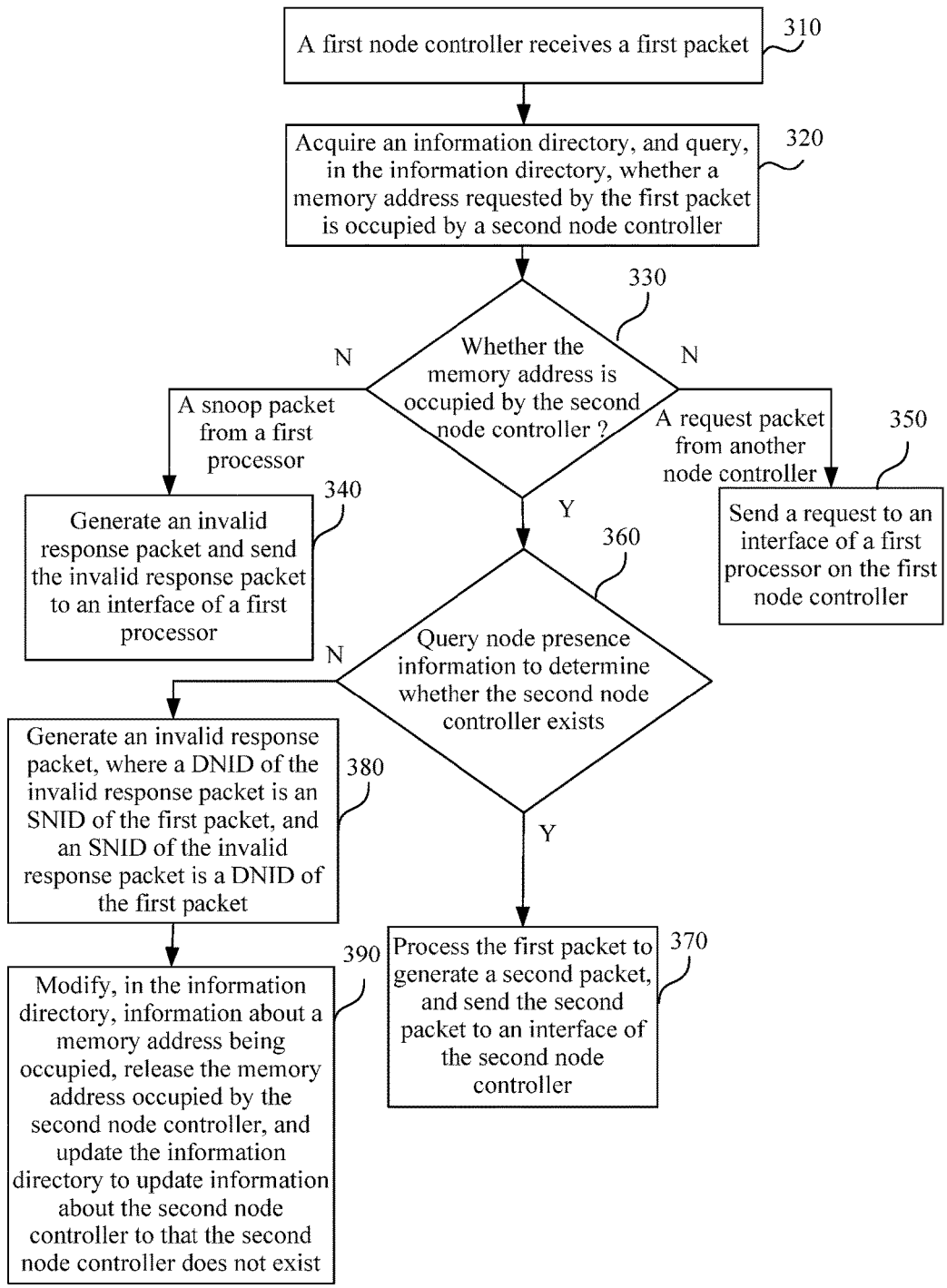
FIG. 3 is a flowchart of a NC-based request responding method according to Embodiment 1 of the present disclosure.

The following describes in detail a NC-based request responding method according to Embodiment 1 of the present disclosure using FIG. 1 and FIG. 2 in conjunction with FIG. 3 as examples. The method provided in Embodiment 1 of the present disclosure may be applied in a case in which node hot removal occurs in a multi-node interconnection system. FIG. 1 is a schematic diagram of multi-node interconnection according to Embodiment 1 of the present disclosure. FIG. 2 is a swim lane diagram of packet sending and responding according to Embodiment 1 of the present disclosure. FIG. 3 is a flowchart of the NC-based request responding method according to Embodiment 1 of the present disclosure. In the multi-node interconnection system shown in FIG. 1, a NC NC0 receives a first packet sent by a CPU0, and the NC0 determines, by querying an information directory, whether a memory address requested, by the first packet, for snooping is occupied by an NC3. If it is determined that the memory address is occupied, the NC0 queries node presence information to determine whether an NC3 node exists. If the NC3 node is removed, the NC0 directly generates an invalid response packet and returns the invalid response packet to the CPU0. In this way, it is implemented that the current NC NC0 processes the first packet destined for the removed NC3 node, directly converts a snoop request to an invalid response, and sends the invalid response packet to the CPU0, thereby greatly improving performance and reliability of the system.

Furthermore, as shown in FIG. 3, the NC-based request responding method includes the following steps Step 310: A first NC receives a first packet, where the first packet is a snoop packet from an interface of a CPU or a request packet from an interface of another NC.

The snoop packet is used to query whether another external node occupies data at a memory address of a local node. The request packet is used to acquire data at a memory address of a requested node.

In an example, as shown in FIG. 2, the CPU0 is a processor on the NC0, and the NC0 receives a SnpInvOwn packet that is from the CPU0 and that has undergone protocol processing, where a DNID of the SnpInvOwn packet corresponds to the NC NC3.

Step 320: Acquire an information directory, and query, in the information directory, whether a memory address requested by the first packet is occupied by a second NC.

Furthermore, in a process of performing the protocol processing on the sent snoop request, the NC0 acquires the information directory, and queries, in the information directory, whether a memory address snooped by the SnpInvOwn packet is occupied by the NC3. The information directory includes information about a memory address of a current NC being occupied by another NC. In this example, the information directory of the NC0 records information about a memory address of the NC0 being occupied by an NC1, an NC2, and the NC3.

Step 330: Determine whether the memory address is occupied by the second NC.

Further, it is determined, according to the information recorded in the foregoing information directory, whether a memory address requested, by the CPU0, for snooping is occupied by the NC3.

If the NC3 occupies the memory address, step 360 is performed.

Step 360: Query node presence information to determine whether the second NC exists.

The node presence information refers to information that is configured in an NC and records whether there is another node in an NC domain. Whether the NC3 exists may be determined by querying the information. If it is determined that the NC3 exists, step 370 is performed. If it is determined that the NC3 does not exist, steps 380 and 390 are performed.

Step 370: Process the first packet to generate a second packet, and send the second packet to an interface of the second NC.

If the NC3 exists, the NC0 generates, according to the received SnpInvOwn packet, a corresponding snoop packet of an NC domain, and sends the snoop packet to an NC3 interface.

Step 380: Generate an invalid response packet, where a DNID of the invalid response packet is an SNID of the first packet, and an SNID of the invalid response packet is a DNID of the first packet.

Furthermore, when it is determined, by querying the node presence information, that the NC3 does not exist, the NC0 directly generates an invalid response packet RspI according to the received snoop request, sends the invalid response packet RspI to the CPU0, and notifies the CPU0 that the NC3 requested, by the CPU0, for snooping is not present. A DNID of the invalid response packet RspI is a source node identifier SNID of SnpInvOwn, and an SNID of the invalid response packet RspI is a DNID of SnpInvOwn.

Step 390: Change, in the information directory, information about the memory address of the first NC being occupied, release the memory address occupied by the second NC, and update the information directory to update information about the second NC to that the second NC does not exist.

Further, the node presence information is updated, information about removal of the NC3 is recorded, information about the memory address of the NC0 being occupied by the NC3 is modified in the information directory, and the memory address is released.

In addition, when the memory address is not occupied by the second NC, and the first packet received by the first NC is a snoop packet from a first processor, after step 330, the method further includes the following step.

Step 340: Generate an invalid response packet and send the invalid response packet to an interface of a first processor.

The NC0 directly generates an invalid response packet RspI according to the received snoop request, sends the invalid response packet RspI to the CPU0, and notifies the CPU0 that the NC3 requested, by the CPU0, for snooping is not present. A DNID of the invalid response packet RspI is a SNID in SnpInvOwn, and an SNID of the invalid response packet RspI is a DNID of SnpInvOwn.

In addition, when the memory address is not occupied by the second NC, and the first packet received by the first NC is the request packet from the other NC, after step 330, the method further includes the following step.

Step 350: Send a request to an interface of a first processor on the first NC.

In another example, when the received SnpInvOwn packet is a request packet sent by the NC1, that is, a placeholder request that is sent for memory address space of the CPU0 of an NC0 node, and if the NC0 determines, after a query, that a requested memory address is not occupied by the NC3, the NC0 directly sends the request to the CPU0.

In addition, at another moment when an NC node in the NC domain is removed, the removed node is correspondingly recorded in node presence information of other NC nodes.

According to the NC-based request responding method provided in Embodiment 1, information about whether other NCs are present is simply configured in a NC, and when an NC node is removed, corresponding node presence information is updated, and placeholder information of the removed node is updated in directory information such that memory updating does not need to be performed on a CPU of each node in a system when a node is removed. In this way, it is implemented that an NC processes a packet destined for the removed node and directly converts a snoop request to an invalid response for feedback, thereby greatly improving performance and reliability of the system.

Figure 4:
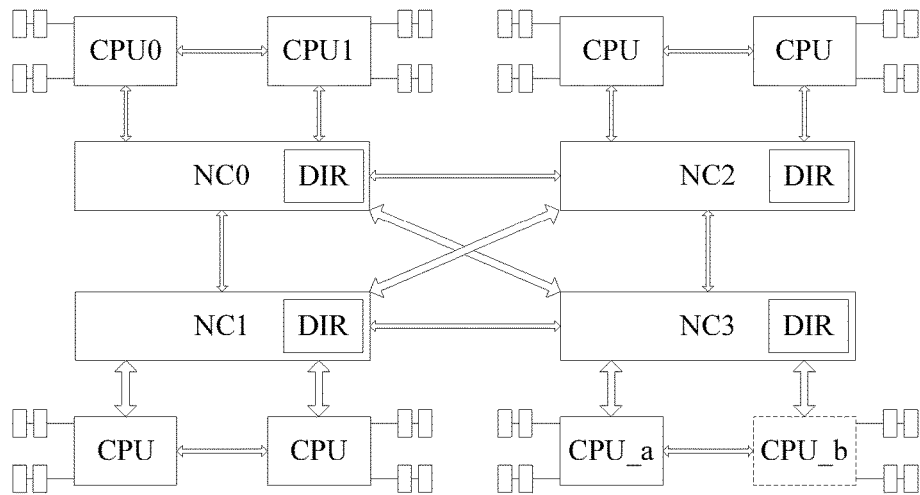
FIG. 4 is a schematic diagram of multi-node interconnection according to Embodiment 2 of the present disclosure.
Figure 5:
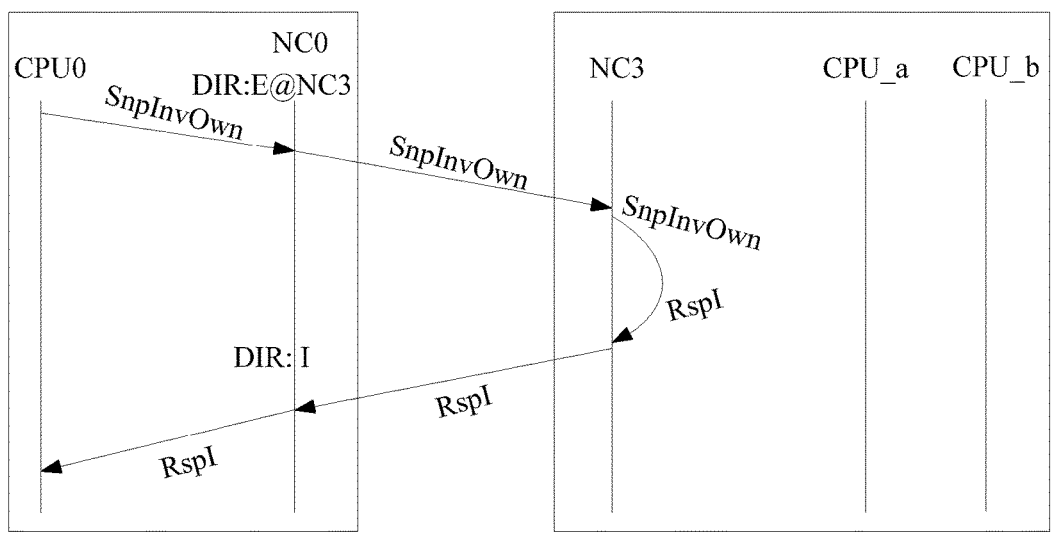
FIG. 5 is a swim lane diagram of packet sending and responding according to Embodiment 2 of the present disclosure.
Figure 6:
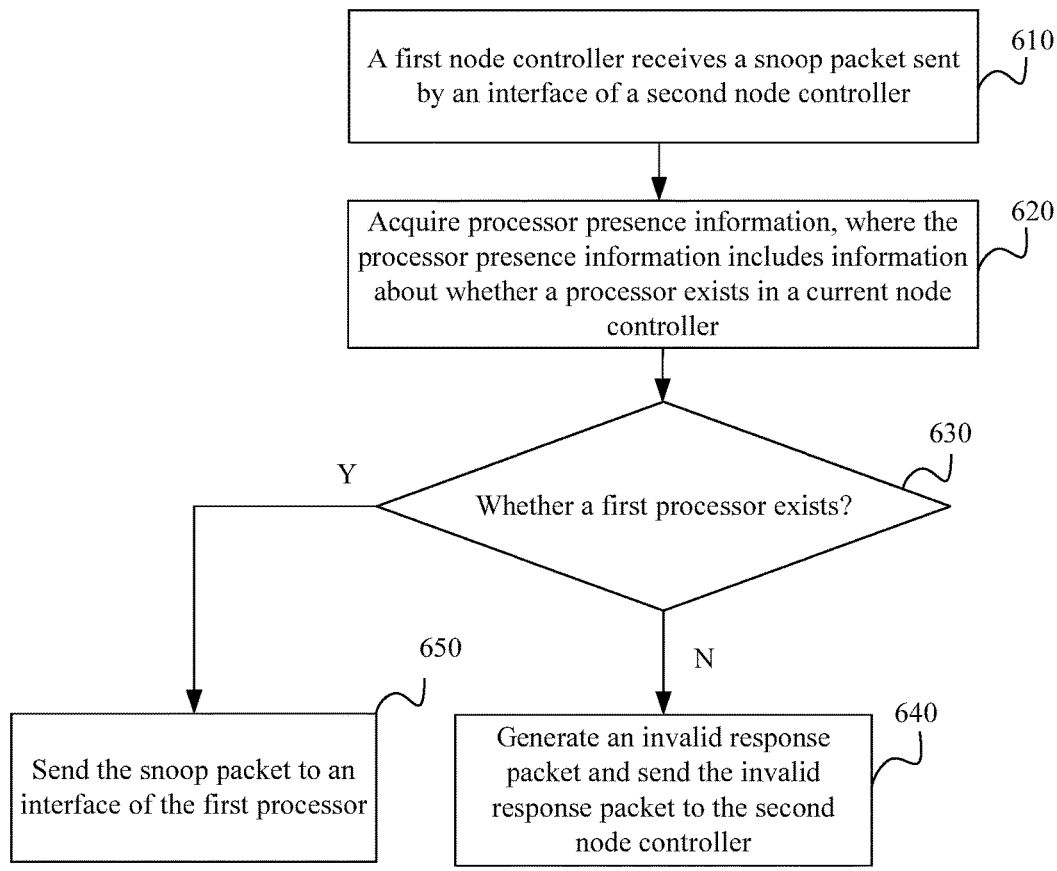
FIG. 6 is a flowchart of a NC-based request responding method according to Embodiment 2 of the present disclosure.

The following describes in detail a NC-based request responding method according to Embodiment 2 of the present disclosure using FIG. 4 and FIG. 5 in conjunction with FIG. 6 as examples. The method provided in Embodiment 2 of the present disclosure may be applied in a case in which hot removal occurs on a processor on a node in a multi-node interconnection system. FIG. 4 is a schematic diagram of multi-node interconnection according to Embodiment 2 of the present disclosure. FIG. 5 is a swim lane diagram of packet sending and responding according to Embodiment 2 of the present disclosure. FIG. 6 is a flowchart of the NC-based request responding method according to Embodiment 2 of the present disclosure. In the multi-node interconnection system shown in FIG. 4, a CPU_b on an NC3 node is removed, and when a snoop packet sent by an NC0 and received by a NC NC3 is to be sent to the CPU_b, the NC3 may determine, by querying processor presence information, that the snoop packet is to be destined for the removed processor CPU_b. In this case, the NC NC3 processes the snoop packet to be destined for the removed processor CPU_b, directly converts a snoop request to an invalid response, and sends the invalid response packet to the NC0, thereby greatly improving performance and reliability of the system.

Furthermore, as shown in FIG. 6, the NC-based request responding method includes the following steps.

Step 610: A first NC receives a snoop packet sent by an interface of a second NC, where a DNID of the snoop packet indicates a first processor.

Furthermore, in an example, as shown in FIG. 5, after performing protocol processing on a snoop packet sent from a CPU0, an NC0 generates a SnpInvOwn packet and sends the SnpInvOwn packet to an NC3, where a DNID of the SnpInvOwn packet corresponds to a CPU_b on the NC NC3, and in other words, the SnpInvOwn packet is to be sent to the CPU_b.

Step 620: Acquire processor presence information, where the processor presence information includes information about whether a processor exists in a current NC.

Further, in a process of performing the protocol processing on the sent snoop packet, the NC3 acquires processor presence information. The processor presence information is preconfigured information and is used to record presence information of a processor that is on a current node.

Step 630: Determine, according to the processor presence information, whether the first processor exists.

Furthermore, if the CPU_b does not exist in the NC3, step 640 is performed.

If the CPU_b exists in the NC3, step 650 is performed.

Step 640: Generate an invalid response packet and send the invalid response packet to the interface of the second NC, where a DNID of the invalid response packet is an SNID of a first packet, and an SNID of the invalid response packet is a DNID of the first packet.

Furthermore, in this example, the NC3 identifies, according to the processor presence information, that the CPU_b does not exist. The NC3 directly generates an invalid response packet RspI according to a received snoop request, and sends the invalid response packet RspI to the NC0. Then, the NC0 processes the invalid response packet RspI, sends the invalid response packet RspI to the CPU0, and notifies the CPU0 that the CPU_b requested, by the CPU0, for snooping does not exist. A DNID of the invalid response packet RspI is an SNID of the SnpInvOwn packet. An SNID of the invalid response packet RspI is the DNID of the SnpInvOwn packet.

Step 650: Send the snoop packet to an interface of the first processor.

If the NC3 identifies, according to the processor presence information, that the CPU_b exists, the NC3 sends the snoop packet to an interface of the CPU_b.

The method further includes, when hot removal occurs on a processor on a node, updating processor presence information on the node, recording information about the removal of the processor in the processor presence information, and updating recorded information of the processor to that the processor does not exist.

According to the snoop-related method provided in Embodiment 2, information about whether a processor is present on a node is simply configured in a NC, and when a processor is removed, corresponding processor presence information is updated such that memory updating does not need to be performed on a CPU of each node in a system when a processor is removed. In this way, it is implemented an NC processes a packet destined for the removed processor and directly converts a snoop request to an invalid response for feedback, thereby greatly improving performance and reliability of the system.

Figure 7:
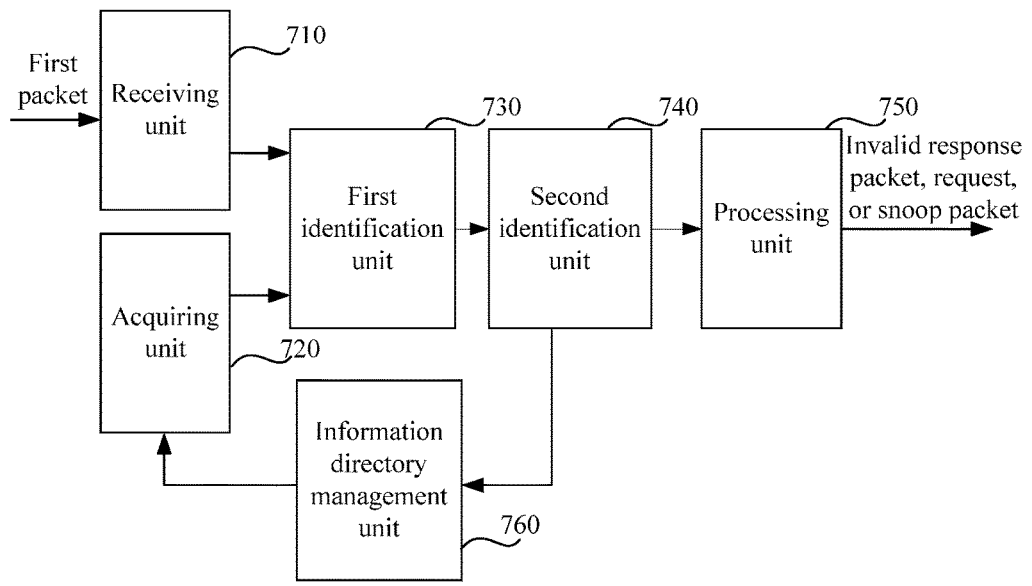
FIG. 7 is a schematic structural diagram of a request responding apparatus according to Embodiment 3 of the present disclosure.

Correspondingly, the present disclosure further discloses a request responding apparatus, and as shown in FIG. 7, the request responding apparatus in an embodiment includes a receiving unit 710, an acquiring unit 720, a first identification unit 730, a second identification unit 740, and a processing unit 750. The request responding apparatus in this embodiment of the present disclosure may be a NC on a multi-node interconnection network. Furthermore, the request responding apparatus may be a NC chip or a circuit board equipped with a NC chip.

The receiving unit 710 is configured to receive a first packet, where the first packet is a snoop packet from an interface of a CPU or a data or status request packet from an interface of another NC.

The acquiring unit 720 is configured to acquire an information directory, where the information directory includes information about a memory address of a current NC being occupied by another NC.

The first identification unit 730 is configured to query, in the information directory, whether a memory address requested by the first packet is occupied by a second NC.

The second identification unit 740 is as follows. When the memory address requested by the first packet is occupied by the second NC, the second identification unit queries node presence information to determine whether the second NC exists.

The processing unit 750 is configured to, when it is determined that the second NC does not exist, generate and send an invalid response packet, where a DNID of the invalid response packet is an SNID of the first packet, and an SNID of the invalid response packet is a DNID of the first packet.

Further, the request responding apparatus further includes an information directory management unit 760 configured to modify, in the information directory, information about a memory address of a first NC being occupied by the second NC, release the memory address occupied by the second NC, and update the node presence information to update information about the second NC to that the second NC does not exist.

The processing unit 750 is further configured to, if the second NC exists, process the first packet to generate a second packet, and send the second packet to an interface of the second NC.

The processing unit 750 is further configured to, when the memory address requested by the first packet is not occupied by the second NC, when the first packet is a snoop packet sent by an interface of a first processor on the first NC, generate an invalid response packet and send the invalid response packet to the interface of the first processor.

The processing unit 750 is further configured to, when the memory address requested by the first packet is not occupied by the second NC, when the first packet is a data or status request packet from an interface of a third NC, send the request packet to an interface of a first processor such that the first processor records information about the request packet.

According to the request responding apparatus provided in this embodiment, node presence information is configured in the apparatus, and the node presence information is updated when an NC node is removed from a system. In this way, when there is a packet destined for the removed node, a snoop request can be directly converted to an invalid response for feedback, without a need to perform, during the node removal, memory updating on a CPU of each node in the system update to implement a record updating upon the node removal, thereby greatly improving performance and reliability of the system.

Figure 8:
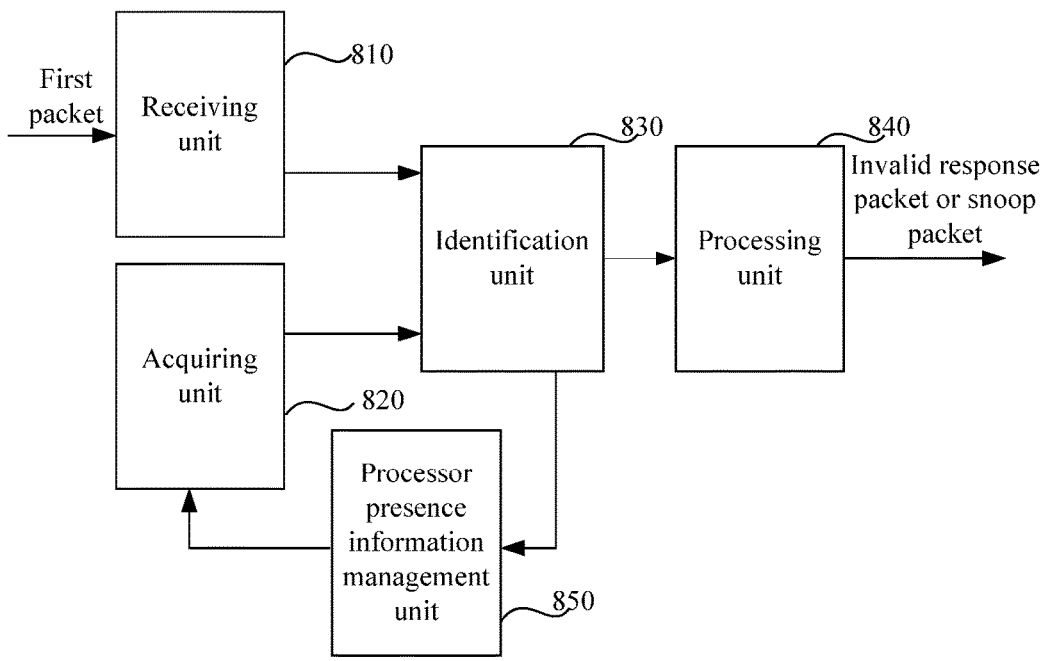
FIG. 8 is a schematic structural diagram of a request responding apparatus according to Embodiment 4 of the present disclosure.

Correspondingly, the present disclosure further discloses another responding apparatus, and as shown in FIG. 8, the request responding apparatus in an embodiment includes a receiving unit 810, an acquiring unit 820, an identification unit 830, and a processing unit 840. The request responding apparatus in this embodiment of the present disclosure may be further a NC on a multi-node interconnection network.

Furthermore, the request responding apparatus may be a NC chip or a circuit board equipped with a NC chip.

The receiving unit 810 is configured to receive a snoop packet sent by an interface of a second NC, where a DNID of the snoop packet indicates a first processor.

The acquiring unit 820 is configured to acquire processor presence information, where the processor presence information includes information about whether a processor exists on a current node.

The identification unit 830 is configured to identify, according to the processor presence information, whether the first processor exists.

If the first processor does not exist, the processing unit 840 generates an invalid response packet and sends the invalid response packet to the interface of the second NC, where a DNID of the invalid response packet is an SNID of the snoop packet, and an SNID of the invalid response packet is the DNID of the snoop packet.

The processing unit 840 is further configured to, if the first processor exists, send the snoop packet to an interface of the first processor.

Further, the apparatus includes a processor presence information management unit 850 configured to, when the first processor is removed, update recorded information of the first processor in the processor presence information to update the recorded information of the first processor to that the first processor does not exist.

According to the request responding apparatus provided in this embodiment, processor presence information of a current node is configured in the apparatus, and the processor presence information is updated when a processor is removed from the current node. In this way, when there is a snoop packet destined for the removed processor, the snoop request can be directly converted to an invalid response for feedback, without a need to perform, during the processor removal, memory updating on a CPU of each node in a system update to update a record, thereby greatly improving performance and reliability of the system.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disc read-only memory (CD-ROM), or any other form of storage medium known in the art.

In the foregoing specific implementation manners, the objective, technical solutions, and benefits of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A method comprising:
    receiving, by a first node controller, a first packet, comprising a snoop packet from a first interface of a processor connected to the first node controller and outside of the first node controller;
    acquiring an information directory;
    querying, in the information directory, whether a memory address requested by the first packet is occupied by a second node controller, the memory address assigned to a memory device directly connected to the processor connected to the first node controller, and the information directory comprising information about whether the memory address is occupied by the second node controller;
    determining the memory address is occupied by the second node controller;
    querying node presence information to determine whether the second node controller exists;
    generating and sending an invalid response packet when the second node controller does not exist, a destination node identifier (DNID) of the invalid response packet comprising a source node identifier (SNID) of the first packet, and a SNID of the invalid response packet comprising a DNID of the first packet;
    modifying, in the information directory, information about the memory address being occupied by the second node controller when the second node controller does not exist; and
    releasing the memory address after modifying the information about the memory address being occupied by the second node.

2. The method according to claim 1, wherein when the second node controller exists, the method further comprises:
    processing the first packet to generate a second packet; and
    sending the second packet to a third interface of the second node controller.

3. The method according to claim 1, wherein when the memory address is not occupied by the second node controller and when the first packet is the snoop packet, the method further comprises:
    generating the invalid response packet; and
    sending the invalid response packet to the first interface.

4. A first node controller comprising:
    a first processor configured to:
        receive a first packet from a first interface of a second processor connected to the first node controller and outside of the first node controller;
        acquire an information directory;
        query, in the information directory, whether a memory address requested by the first packet is occupied by a second node controller, the memory address is assigned to a memory device directly connected to the second processor connected the first node controller, and the information directory comprising information about whether the memory address is occupied by the second node controller;
        determine the memory address is occupied by the second node controller;

query node presence information to determine whether the second node controller exists;

generate and send an invalid response packet when the second node controller does not exist, a destination node identifier (DNID) of the invalid response packet comprising a source node identifier (SNID) of the first packet, and an SNID of the invalid response packet comprising a DNID of the first packet, modify, in the information directory, information about the memory address being occupied by the second node controller when the second node controller does not exist; and release the memory address after modifying the information about the memory address being occupied by the second node.

5. The node controller according to claim 4, wherein when the second node controller exists, the first processor is further configured to:

process the first packet to generate a second packet; and send the second packet to a third interface of the second node controller.

6. The node controller according to claim 4, wherein when the memory address is not occupied by the second node controller and when the first packet is the snoop packet, the first processor is further configured to:

generate an invalid response packet; and send the invalid response packet to the second interface.

7. A non-transitory computer-readable medium comprising computer executable instructions that when executed cause a first node controller to:

receive a first packet from a first interface of a processor connected to the first node controller and outside of the first node controller;

acquire an information directory;

query, in the information directory, whether a memory address requested by the first packet is occupied by a second node controller, the memory address assigned to a memory device directly connected to the processor connected to the first node controller, and the information directory comprising information about whether the memory address is occupied by the second node controller;

determine the memory address is occupied by the second node controller;

query node presence information to determine whether the second node controller exists;

generate and send an invalid response packet when the second node controller does not exist, a destination node identifier (DNID) of the invalid response packet comprising a source node identifier (SNID) of the first packet, and an SNID of the invalid response packet comprising a DNID of the first packet;

modify, in the information directory, information about the memory address being occupied by the second node controller when the second node controller does not exist; and release the memory address after modifying the information about the memory address being occupied by the second node.

* * * * *